(12) United States Patent
Nakano

(10) Patent No.: US 8,262,231 B2
(45) Date of Patent: Sep. 11, 2012

(54) LIGHT CONTROL DEVICE, LIGHTING DEVICE, AND PROJECTOR FOR CONTROLLING TRANSMISSION AMOUNT OF LIGHT EMITTED FROM AN EMISSION AREA BY USE OF CURVED LIGHT SHIELDING MEMBERS

(75) Inventor: Hirohisa Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 344 days.

(21) Appl. No.: 12/398,738

(22) Filed: Mar. 5, 2009

(65) Prior Publication Data

US 2009/0225389 A1 Sep. 10, 2009

(30) Foreign Application Priority Data

Mar. 10, 2008 (JP) .................................. 2008-059660
Dec. 15, 2008 (JP) .................................. 2008-318112

(51) Int. Cl.
*G03B 21/14* (2006.01)
(52) U.S. Cl. ......................................................... 353/97
(58) Field of Classification Search .............. 353/88–93, 353/97, 98; 359/227, 234, 236; 396/452; 313/146; 378/152, 153
See application file for complete search history.

(56) References Cited

U.S. PATENT DOCUMENTS

| | | | | |
|---|---|---|---|---|
| 3,712,706 A | * | 1/1973 | Stamm | 359/531 |
| 4,380,820 A | * | 4/1983 | Cutter | 378/153 |
| 6,818,287 B1 | | 11/2004 | Ogawa et al. | |
| 7,055,966 B2 | * | 6/2006 | Momose et al. | 353/97 |
| 2008/0304022 A1 | | 12/2008 | Yamada et al. | |

FOREIGN PATENT DOCUMENTS

| | | |
|---|---|---|
| JP | A-2000-75353 | 3/2000 |
| JP | A-2002-229095 | 8/2002 |
| JP | A-2004-264819 | 9/2004 |
| JP | A-2004-325745 | 11/2004 |
| JP | A-2005-292531 | 10/2005 |
| JP | A-2005-292764 | 10/2005 |
| JP | A-2006-23365 | 1/2006 |
| JP | A-2006-72151 | 3/2006 |
| JP | A-2006-78787 | 3/2006 |
| JP | A-2006-84658 | 3/2006 |
| JP | A-2006-337947 | 12/2006 |
| JP | A-2006-337948 | 12/2006 |
| JP | A-2007-3839 | 1/2007 |
| JP | A-2007-71913 | 3/2007 |
| JP | A-2007-114672 | 5/2007 |
| JP | A-2007-156230 | 6/2007 |
| JP | A-2009-015295 | 1/2009 |

* cited by examiner

*Primary Examiner* — Thanh Luu
*Assistant Examiner* — Renee Naphas
(74) *Attorney, Agent, or Firm* — Oliff & Berridge, PLC

(57) ABSTRACT

A light control device which controls the transmission amount of light emitted from a predetermined emission area includes a rotation member having a rotation axis extending in a direction substantially orthogonal to the center axis of the light, and a light shielding member supported by the rotation member and shielding at least a part of the light by rotation of the rotation member. The light shielding member has a light shielding surface which shields received light. The light shielding surface is so processed as to reduce the amount of light reflected by the light shielding surface, and reaching the emission area.

6 Claims, 13 Drawing Sheets

LIGHT CONTROL DEVICE, LIGHTING DEVICE, AND PROJECTOR FOR CONTROLLING TRANSMISSION AMOUNT OF LIGHT EMITTED FROM AN EMISSION AREA BY USE OF CURVED LIGHT SHIELDING MEMBERS

BACKGROUND

1. Technical Field

The present invention relates to a light control device for controlling transmission amount of light emitted from a predetermined emission area, and a lighting device and a projector including the light control device.

2. Related Art

Currently, such type of projector is known which includes a light source device, a light modulation device for modulating light emitted from the light source device according to image information to produce image light, and a projection device for enlarging and projecting the produced image light. The light source device included in the projector in most cases has a light source lamp, and a reflection mirror for reflecting light emitted from the light source lamp to release the light in one direction.

As an example of this type of projector, such a projector has been proposed which has a light control device for controlling the amount of light emitted from the light source device and entering the light modulation device for the purpose of improvement in the contrast of projected images or other purposes (see JP-A-2007-71913, for example).

The light control device shown in JP-A-2007-71913 includes a pair of shielding members disposed symmetric with respect to the center axis of entering light, a pair of rotation shafts for supporting the shielding members and rotating to interpose the shielding members on the optical path of the light, a drive mechanism for rotating the pair of rotation shafts, and a fixing member for supporting the pair of the rotation shafts and the drive mechanism as one piece. This light control device is disposed between a pair of lens arrays provided to uniformly illuminate an image forming area of a liquid crystal panel as light modulation device with the light emitted from the light source device. The shielding members are inserted into the light transmitting area of the light control device according to the drive of the drive mechanism, that is, the rotation of the rotation shafts so as to control the amount of light supplied to the image forming area by partially shielding the supplied light using the shielding members.

According to the light control device disclosed in JP-A-2007-71913, the shielding members are disposed orthogonal to the center axis of the light supplied to the shielding members when the pair of the shielding members are full close, that is, when the pair of the shielding members are positioned on the same flat plane. In this case, the light supplied to the shielding members travels along the optical path of the light emitted from the light source device and supplied to the shielding members in the opposite direction and reaches the light source device. When the light reflected by the shielding members enters the light source device (particularly the light source lamp) in this manner, the temperature of the light source device increases. As a result, the light source device easily deteriorates.

SUMMARY

It is an advantage of some aspects of the invention to provide a light control device, a lighting device, and a projector capable of reducing the amount of light returning to an emission area of light.

A light control device which controls the transmission amount of light emitted from a predetermined emission area according to a first aspect of the invention includes a rotation member having a rotation axis extending in a direction substantially orthogonal to the center axis of the light, and a light shielding member supported by the rotation member and shielding at least a part of the light by rotation of the rotation member. The light shielding member has a light shielding surface which shields received light. The light shielding surface is so processed as to reduce the amount of light reflected by the light shielding surface and reaching the emission area.

In this structure, the amount of light entering the light control device and returning to the emission area is smaller than the amount of light supplied to the light shielding surface due to the process applied to the light shielding surface. When a light source device having the light source lamp and the reflection mirror described above is used as a light source for supplying light to the light control device, for example, the light source lamp corresponds to the emission area of light. Thus, the amount of light returning to the light source lamp becomes smaller than the amount of light supplied to the light shielding member, and temperature increase of the light source lamp is prevented. Accordingly, temperature increase of the emission area can be reduced, and deterioration of the light source lamp can be avoided when the light source lamp is used as the emission area.

It is preferable that the light shielding surface is curved in such a manner as to project toward the emission area.

In this structure, the light shielding surface is a curved surface projecting toward the emission area. When the light shielding member is disposed substantially orthogonal to the center axis of light emitted from the emission area, the received light can be reflected in such a direction as to diffuse to the outside of the transmission area of the light emitted from the emission area by using the light shielding surface. Thus, the amount of light traveling along the optical path extending from the emission area to the light shielding surface in the opposite direction to reach the emission area can be securely reduced. Accordingly, temperature increase of the emission area can be securely prevented.

It is preferable that a light absorbing layer which absorbs light supplied to the light shielding surface is provided on the light shielding surface.

In this structure, the amount of light supplied to the light shielding surface and reflected by the light shielding surface is reduced by the light absorbing layer formed on the light shielding surface. Thus, light reaching the emission area from the light shielding surface can be securely reduced, and temperature increase of the emission area can be securely prevented. When the light absorbing layer is provided on the curved light shielding surface, the amount of light reaching the emission area can be further securely decreased. Thus, temperature increase of the emission area can be further reduced.

It is preferable that the light shielding surface has a protrusion containing an inclined surface inclined to the center axis of the light when the light shielding member is disposed substantially orthogonal to the center axis of the light.

In this structure, light supplied to the light shielding surface is reflected in such a direction as to diffuse to the outside of the transmission area of light emitted from the emission area by the protrusion having the inclined surface provided on the light shielding surface and inclined to the center axis when the light shielding member is disposed substantially orthogonal to the center axis of the light emitted from the emission area. Thus, the amount of light traveling along the optical path extending from the emission area to the light shielding surface in the opposite direction and reaching the emission area can be reduced similarly to the curved light shielding surface described above. Accordingly, temperature increase of the emission area can be securely prevented. When the protrusion is formed on the curved light shielding surface or the light shielding surface having the light absorbing layer, the amount of light reaching the emission area can be further reduced.

A lighting device according to a second aspect of the invention includes a light source device emitting light; and the light control device described above. The light source device has a light source lamp having a light emission unit for emitting light, and a reflection mirror for reflecting light emitted from the light source lamp and releasing the light in one direction. The light shielding member is disposed on the optical path of the light. The emission area is the light emission unit of the light source lamp.

The light emission unit corresponds to an area of the light source lamp where a pair of electrodes are provided (particularly area between the electrodes) when the light source lamp is a type which has a pair of electrodes and emits light by applying voltage to the pair of the electrodes.

In this structure, advantages similar to those of the light control device can be provided.

Since the emission area of light supplied to the light shielding member is the light emission unit of the light source lamp included in the light source device, temperature increase of the light emission unit can be prevented. Accordingly, deterioration of the light source lamp and the lighting device can be avoided.

A projector according to a third aspect of the invention includes: the lighting device described above; a light modulation device which modulates light emitted from the lighting device to form image light corresponding to image information; and a projection optical device which projects the image light formed by the light modulation device.

In this structure, advantages similar to those of the lighting device described above can be provided. Moreover, the amount of light supplied to the light modulation device from the lighting device can be controlled by the light control device. Thus, contrast of images formed by the light modulation device and projected by the projection optical device can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. First Embodiment

Figure 1:
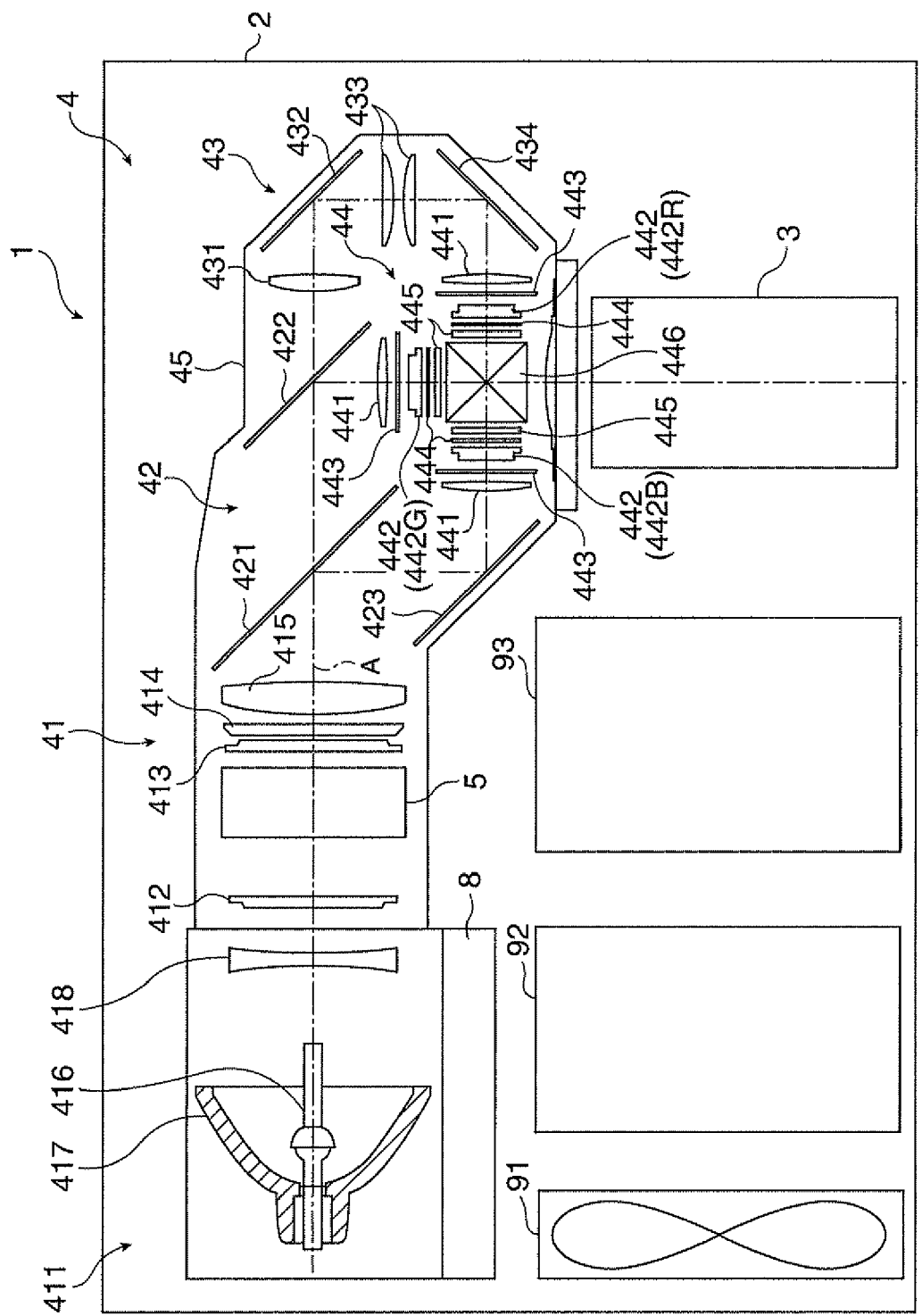
FIG. 1 schematically illustrates a structure of a projector according to a first embodiment of the invention.

A projector according to a first embodiment of the invention is hereinafter described with reference to the drawings.
Structure of Projector FIG. 1 schematically illustrates a structure of a projector 1 according to this embodiment.

The projector 1 in this embodiment produces image light corresponding to images according to image information inputted from the outside, and enlarges and projects the image light on a projection surface such as screen. As illustrated in FIG. 1, the projector 1 includes an outer housing 2, a projection lens 3, and an optical unit 4.

The projector 1 further includes a cooling unit 91 having a cooling fan and the like for cooling the interior of the projector 1, a power source unit 92 for supplying power to the respective components contained in the projector 1, a control unit 93 for controlling the overall projector 1, and others. The units 91 through 93 are disposed within the outer housing 2.
Structure of Outer Housing and Projection Lens The outer housing 2 accommodates the projection lens 3, the optical unit 4, and other components, and generally has a substantially rectangular parallelepiped shape. While the outer housing 2 is made of synthetic resin in this embodiment, the outer housing 2 may be made of other material such as metal.

The projection lens 3 is a projection optical device which forms an image corresponding to image light produced by the optical unit 4 onto the projection surface, and enlarges and projects the image corresponding to the image light. The projection lens 3 is constituted by a plurality of lenses contained in a cylindrical lens-barrel as a combined lens.
Structure of Optical Unit The optical unit 4 is a unit for optically processing light emitted from a light source under the control of the control unit 93 to form image light corresponding to image information. The optical unit 4 has substantially L shape in the plan view which extends along the back surface of the outer housing 2 and extends along the side surface of the outer housing 2.

The optical unit 4 has a lighting optical device 41, a color separation optical device 42, a relay optical device 43, an electro-optical device 44, and an optical component housing 45 for accommodating the optical components 41 through 44 and supporting and fixing the projection lens 3 at a predetermined position.

Structure of Lighting Optical Device

The lighting optical device 41 corresponds to a lighting device according to the invention, and applies light to image forming areas of liquid crystal panels 442 to be described later contained in the electro-optical device 44 substantially uniformly. The lighting optical device 41 has a light source device 411, a first lens array 412, a second lens array 413, a polarization conversion element 414, a superimposing lens 415, and a light control device 5.

Figure 6:
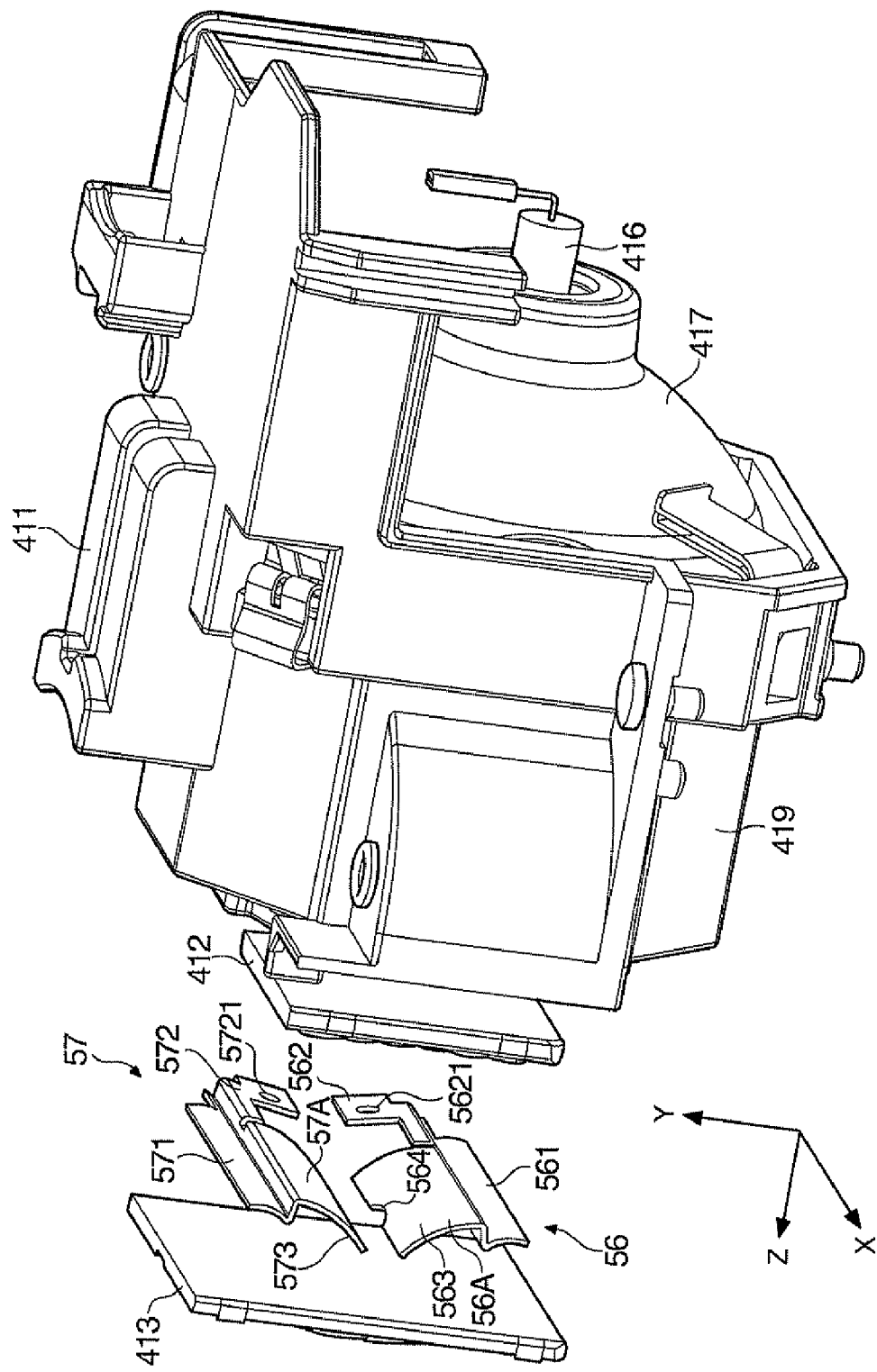
FIG. 6 is a perspective view showing the positional relationship between light shielding members and first and second lens arrays in the first embodiment.

The light source device 411 has a light source lamp 416 emitting radiate light, a reflector 417 as a reflection mirror for reflecting and converging the radiate light emitted from the light source lamp 416 at a predetermined position, a collimating concave lens 418 for collimating the light reflected and converged by the reflector 417 with respect to a lighting optical axis A, and a housing 419 for accommodating these components (see FIG. 6). While the light source lamp 416 is an extra-high pressure mercury lamp in this embodiment, the light source lamp 416 may be other discharge-type light source lamp such as halogen lamp and metal halide lamp. The reflector 417 may be constituted by an ellipsoidal reflector having rotational ellipsoidal surface, or a parabolic reflector having rotational parabolic surface. When parabolic reflector is used, the collimating concave lens 418 can be removed.

Though not shown in the figure for detailed depiction, the light source lamp 416 contains a light emission unit 4161 having a pair of electrodes and discharge space in the inside thereof (FIGS. 7 and 8), and a pair of sealing members extending away from each other with the light emission unit 4161 interposed between the sealing members and containing electrode extension lines connected with the respective electrodes. When voltage is applied to the pair of electrodes via the electrode extension lines, discharge is induced between the electrodes within the discharge space. As a result, light is produced between the electrodes. The light emission unit 4161 corresponds to a light emission unit in the invention.

The first lens array 412 has a plurality of small lenses disposed in matrix on a plane substantially orthogonal to the center axis (lighting optical axis A) of light emitted from the light source device 411. These first lenses have substantially rectangular contour as viewed in the direction of the lighting optical axis A, and divide light emitted from the light source device 411 into a plurality of partial lights.

The second lens array 413 has a structure similar to that of the first lens array 412, and has small lenses disposed in matrix in correspondence with the small lenses of the first lens array 412. The second lens array 413 has a function of forming images of the small lenses of the second lens array 413 on the image forming areas of the liquid crystal panels 442 of the electro-optical device 44 to be described later in cooperation with the superimposing lens 415.

The light control device 5 is disposed between the first lens array 412 and the second lens array 413, and controls the amount of light entering the second lens array 413 by shielding a part of light released from the first lens array 412 so as to control the amount of light supplied to the image forming areas of the liquid crystal panels 442 to be described later. The detailed structure of the light control device 5 will be explained later.

The polarization conversion element 414 is disposed between the second lens array 413 and the superimposing lens 415 to convert light released from the second lens array 413 into approximately one type of linear polarized light.

More specifically, the respective partial lights converted into approximately one type of linear polarized lights by using the polarization conversion element 414 are finally stacked approximately on the image forming areas of the liquid crystal panels 442 by using the superimposing lens 415. A projector which has a liquid crystal panel for modulating polarized light uses only one type of polarized light, and thus utilizes only about half of light emitted from the light source device 411 which emits random polarized light. In this embodiment, however, light emitted from the light source device 411 is converted into approximately one type of linear polarized light by using the polarization conversion element 414 to increase light utilization efficiency of the electro-optical device 44.

Structure of Color Separation Optical Device and Relay Optical Device

The color separation optical device 42 has two dichroic mirrors 421 and 422 and a reflection mirror 423, and separates a plurality of partial lights released from the lighting optical device 41 into three color lights in red (R), green (G), and blue (B) by the dichroic mirrors 421 and 422.

The relay optical device 43 has an entrance side lens 431, a relay lens 433, and reflection mirrors 432 and 434, and has a function of guiding the red light separated by the color separation optical device 42 toward a liquid crystal panel 442R for red light.

In this structure, the dichroic mirror 421 of the color separation optical device 42 transmits red light component and green light component of the light released from the lighting optical device 41, and reflects blue light component of the light. The blue light reflected by the dichroic mirror 421 is further reflected by the reflection mirror 423, and travels through a field lens 441 to reach a blue light liquid crystal panel 442B. The field lens 441 converts the respective partial lights released from the second lens array 413 into lights parallel with the center axis (chief ray) of the partial lights. The field lenses 441 disposed on the light entrance sides of the other green light and red light liquid crystal panels 442G and 442R have similar functions.

The green light of the red and green lights having passed through the dichroic mirror 421 is reflected by the dichroic mirror 422, and travels through the field lens 441 to reach the green light liquid crystal panel 442G. The red light passes through the dichroic mirror 422 and the relay optical device 43, and further travels through the field lens 441 to reach the red light liquid crystal panel 442R. The relay optical device 43 is provided for the red light to prevent decrease in light utilization efficiency caused by diffusion or the like of red light whose optical path is longer than those of other color lights. That is, the relay optical device 43 is used to transmit the partial lights having entered the entrance side lens 431 to the field lens 441 as they are. While red light of the three color lights is supplied to the relay optical device 43 in this embodiment, other color lights such as blue light may be supplied thereto.

Structure of Electro-Optical Device

The electro-optical device 44 modulates three color lights released from the color separation optical device 42 according to image information, and combines the modulated color lights to form optical images (color images).

As illustrated in FIG. 1, the electro-optical device 44 has the field lenses 441 described above, the liquid crystal panels 442 (red light liquid crystal panel 442R, green light liquid crystal panel 442G, and blue light liquid crystal panel 442B) as light modulation devices, three entrance side polarization plates 443 disposed on the light entrance sides of the respective liquid crystal panels 442, three visibility angle compensation plates 444 disposed on the light exit sides of the liquid crystal panels 442, three exit side polarization plates 445 disposed on the light exit sides of the three visibility angle compensation plates 444, and a cross dichroic prism 446 as color combining optical device.

The entrance side polarization plates 443 receive the respective color lights converted into lights having substantially one polarization direction by the polarization conversion element 414, and then transmit only polarized lights approximately in the same direction as the polarization direction of the lights equalized by the polarization conversion element 414, and absorb other lights. The entrance side polarization plates 443 are formed by affixing polarization layers onto light transmissive substrates made of sapphire glass, crystal or the like, for example.

Though details are not shown in the figure, each of the liquid crystal panels 442 has a structure produced by sealing liquid crystals as electro-optical substances between a pair of transparent glass substrates. The liquid crystal panels 442 control the orientation condition of the liquid crystals positioned on the image forming areas according to drive signals as image information inputted from the control unit 93, and modulate the polarization directions of polarized lights coming from the entrance side polarization plates 443 to form image lights.

The visibility angle compensation plates 444 compensate for phase difference between normal light and abnormal light produced by double refraction caused on the liquid crystal panels 442 when lights enter the liquid crystal panels 442 in a diagonal direction (entering in a direction inclined to the normal line direction of the panel surface).

The exit side polarization plates 445 transmit only lights contained in the lights received from the liquid crystal panels 442 via the visibility angle compensation plates 444 and having polarization direction orthogonal to the light transmission axis of the entrance side polarization plates 443, and absorb other lights. The exit side polarization plates 445 have a structure similar to that of the entrance side polarization plates 443.

The cross dichroic prism 446 is a color combining optical device for combining lights released from the exit side polarization plates 445 and modulated for each color to form optical images (color images).

The cross dichroic prism 446 has a square shape in the plan view produced by affixing four rectangular prisms, and has two dielectric multilayer films on the boundaries of the affixed rectangular prisms. The dielectric multilayer films transmit color light received via the exit side polarization plate 445 disposed on the side opposed to the projection lens 3 (G light side), and reflect color lights received via the other two exit side polarization plates 445 (R light and B light sides). By this method, the respective color lights modulated by the entrance side polarization plates 443, the liquid crystal panels 442, the visibility angle compensation plates 444, and the exit side polarization plates 445 are combined to form a color image. Image light corresponding to the color image thus produced is enlarged and projected by using the projection lens 3, and the color image is displayed on the projection surface.

Structure of Optical Component Housing

Figure 2:
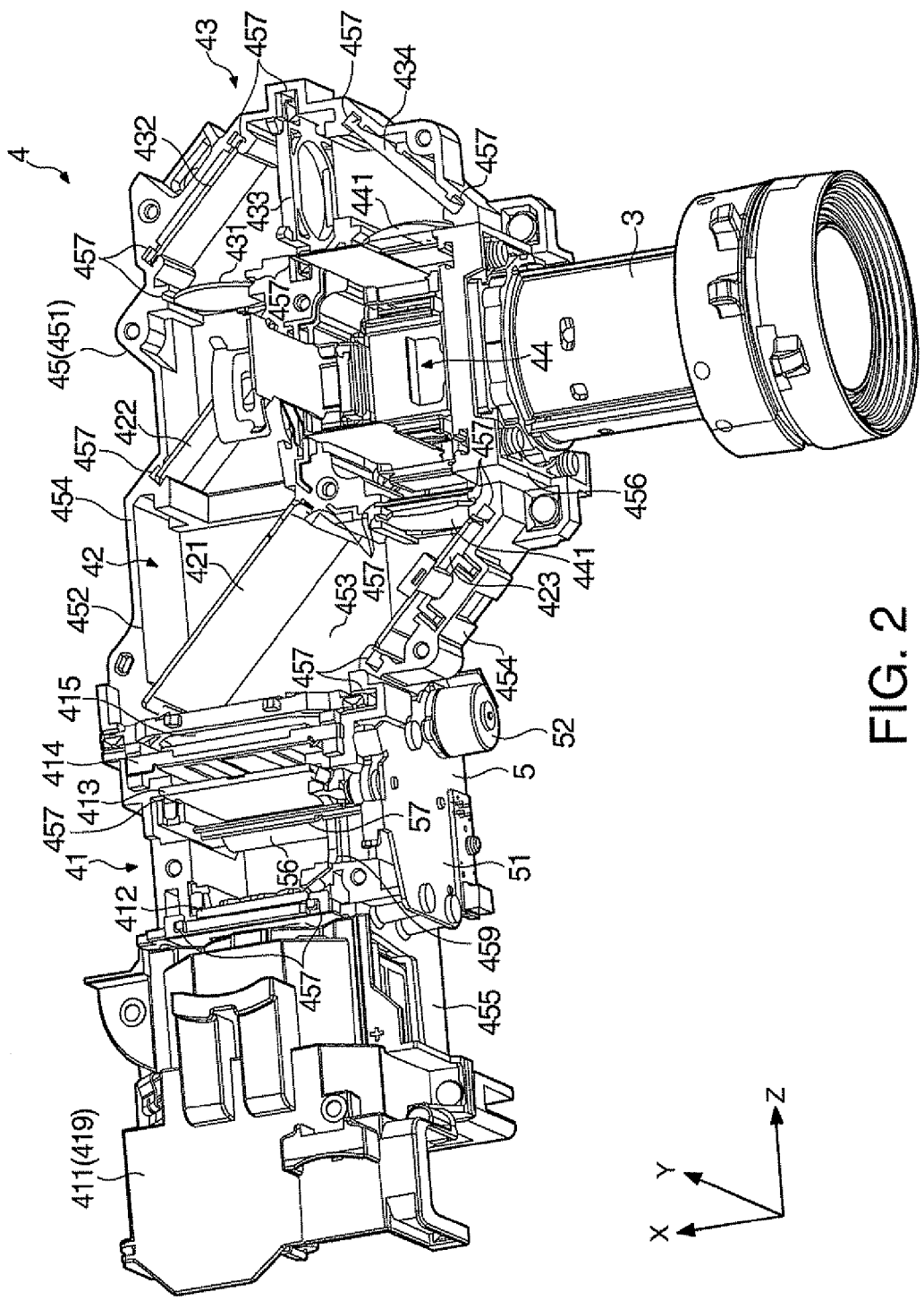
FIG. 2 is a perspective view of an optical component housing in the first embodiment.
Figure 3:
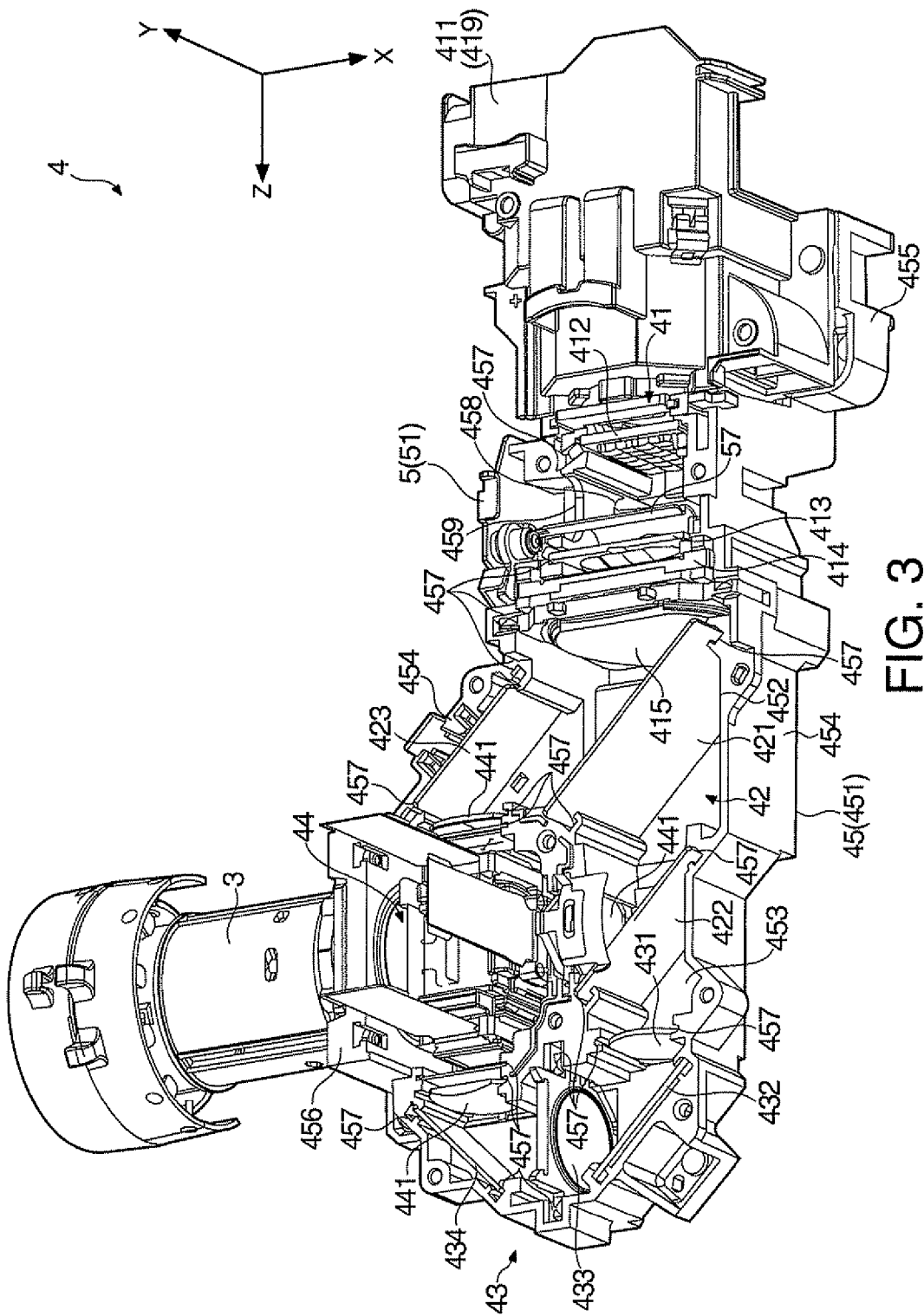
FIG. 3 is a perspective view of the optical component housing in the first embodiment.

FIGS. 2 and 3 are perspective views showing the optical component housing 45. More specifically, FIG. 2 is a perspective view of the optical component housing 45 as viewed in the direction opposite to the projection direction of image light produced from the projection lens 3, and FIG. 3 is a perspective view of the optical component housing 45 as viewed in the projection direction. In FIGS. 2 and 3, Z direction corresponds to the light traveling direction on the center axis of light emitted from the light source device 411 in the range from the light source device 411 to the color separation optical device 42, while X direction and Y direction are orthogonal to each other and to the Z direction. When the projector 1 is placed on the horizontal surface, the X direction corresponds to the horizontal direction extending from the right to the left as viewed in the Z direction. In this case, the Y direction is a direction opposite to the direction of gravity. The X, Y, and Z directions shown in the other figures herein are the same directions as those in FIGS. 2 and 3.

As illustrated in FIGS. 2 and 3, the optical component housing 45 is a box-shaped housing made of synthetic resin and having substantially L shape in the plan view. The optical component housing 45 includes a component storage member 451 having an opening 452 in the upper part through which the optical components described above (such as first lens array 412 and second lens array 413) are inserted, and a cover-shaped member (not shown) for closing the opening 452.

The component storage member 451 has a bottom portion 453 disposed along the bottom of the outer housing 2, and a side portion 454 rising from the edge of the bottom portion 453. The component storage member 451 having these parts is substantially U-shaped in the cross-sectional view such that the opening 452 faces in the Y direction. A light source attachment portion 455 to which the light source device 411 is attached is formed at one end of the component storage member 451, and a lens attachment portion 456 to which the projection lens 3 is attached is formed at the other end. A plurality of grooves 457 for positioning the optical components described above are formed inside the component storage member 451.

An opening 458 (FIG. 3) through which a light shielding member 56 of the light control device 5 to be described later is inserted and a concave portion 459 through which a light shielding member 57 is inserted are formed on the side portion 454 positioned on the attachment side (base side in the X direction) of the projection lens 3. The concave portion 459 continues from the edge of the opening 452. The opening 458 and the concave portion 459 are disposed within the range between the first lens array 412 and the second lens array 413 fixed to the appropriate positions inside the component storage member 451, and are positioned relatively close to the second lens array 413. The light control device 5 is fixed to the side portion 454 by screw or the like with the light shielding members 56 and 57 inserted into the component storage member 451.

Structure of Light Control Device

Figure 4:
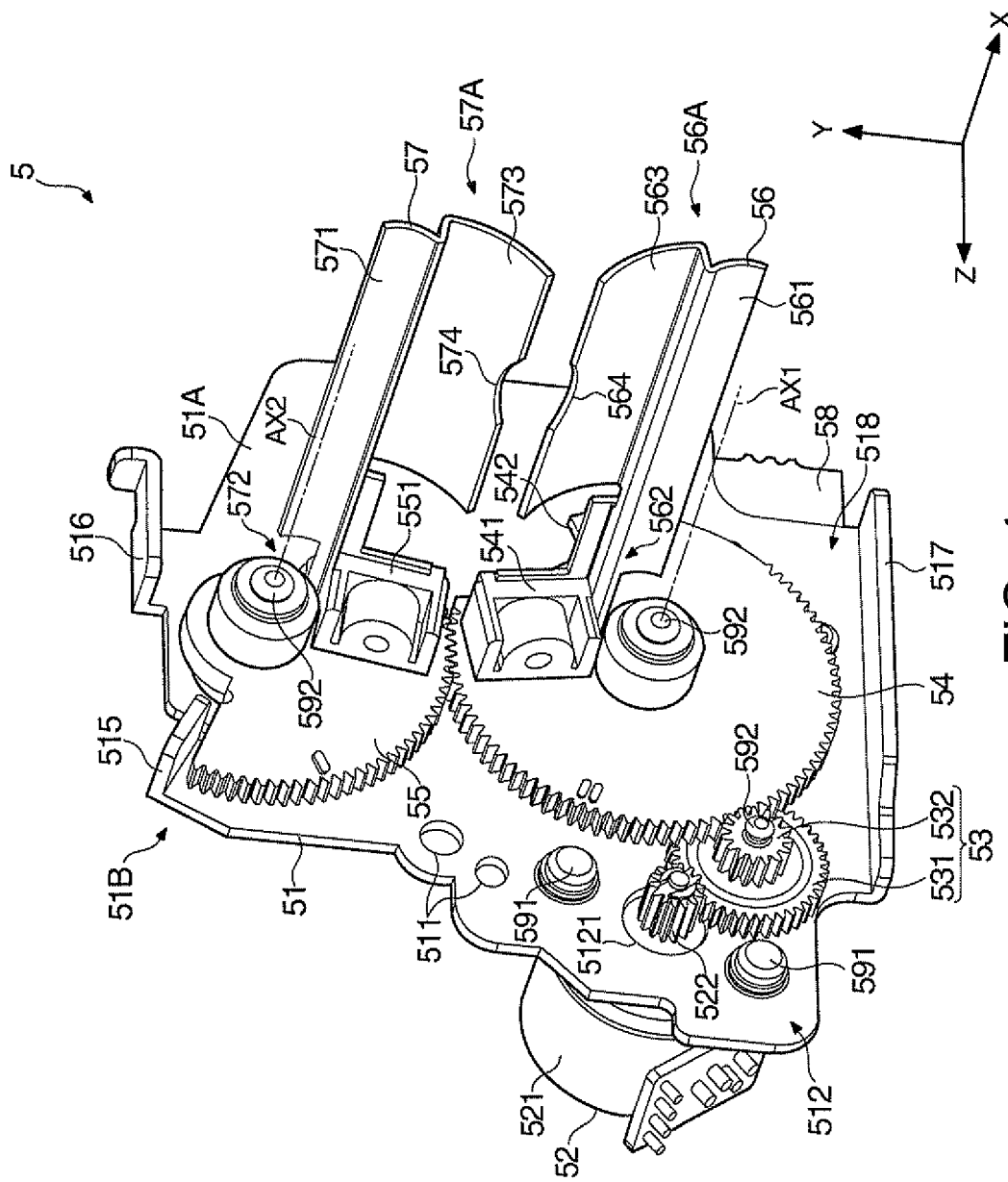
FIG. 4 is a perspective view of a light control device in the first embodiment.
Figure 5:
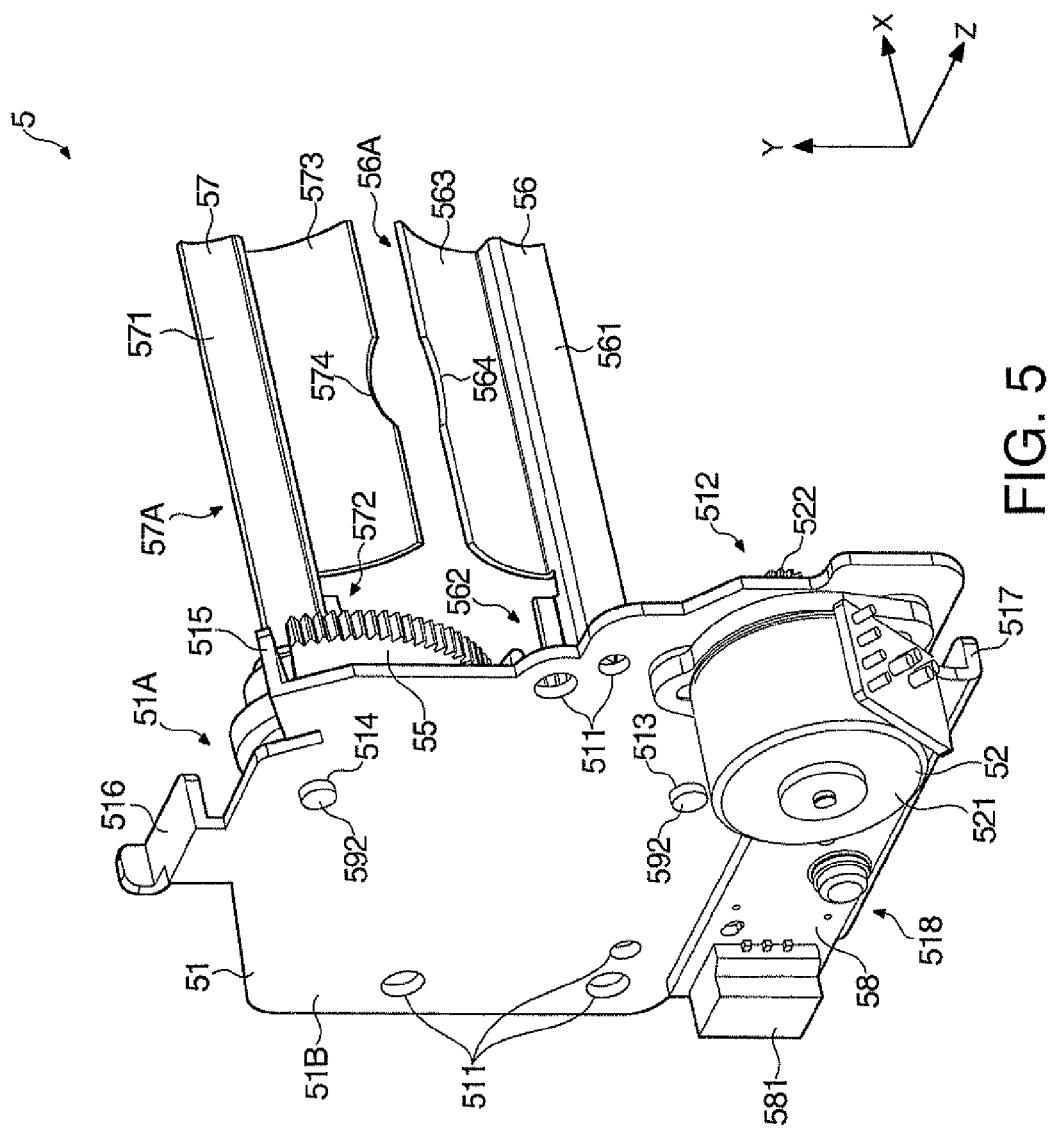
FIG. 5 is a perspective view of the light control device in the first embodiment.

FIGS. 4 and 5 are perspective views of the light control device 5. More specifically, FIG. 4 is a perspective view of the light control device 5 as viewed from one side (surface 51A side), while FIG. 5 is a perspective view of the light control device 5 as viewed from the opposite side (surface 51B side).

The light control device 5 controls the amount of light entering the second lens array 413 and the liquid crystal panel 442 by shielding a part of light received from the first lens array 412 to contribute to improvement in contrast of projection images. As illustrated in FIGS. 4 and 5, the light control device 5 has a supporting member 51, a stepping motor 52 as a drive unit (hereinafter abbreviated as "motor"), gears 53 through 55, the light shielding members 56 and 57, and a photo-sensor 58.

The supporting member 51 is a flat-plate-shaped component having substantially rectangular shape in the side view and formed by metal plate, and is attached to the component storage member 451 along the side portion 454 by screws (not shown) inserted through a plurality of holes 511 formed at the peripheral portion of the supporting member 51 such that the light control device 5 can be attached to the optical component housing 45. The gears 53 through 55 and the light shielding members 56 and 57 are disposed on the surface 51A of the supporting member 51 opposed to the side portion 454, and the motor 52 and the photo-sensor 58 are disposed on the surface 51B opposite to the surface 51A.

The supporting member 51 further has a motor attachment portion 512, gear attachment portions 513 and 514, bended portions 515 through 517, and a sensor attachment portion 518 as well as the holes 511.

The motor attachment portion 512 is formed at the end of the distal end side of the supporting member 51 in the Z direction. The motor attachment portion 512 has a substantially circular opening 5121 through which a gear 522 of the motor 52 to be described later is exposed toward the surface 51A, and a pair of holes (not shown) between which the opening 5121 is positioned. Screws 591 are inserted through the pair of the holes to attach the motor 52 disposed on the surface 51B to the supporting member 51.

Though not shown in the figures, the gear attachment portion to which the gear 53 is attached is formed as a hole provided on the base side of the motor attachment portion 512 in the Z direction. As illustrated in FIG. 5, the gear attachment portions 513 and 514 to which the gears 54 and 55 are attached are formed as holes both approximately at the center of the supporting member 51 in the Z direction, and at the base and the end of the supporting member 51 in the Y direction, respectively. Screws 592 penetrating through the gears 53 through 55 are screwed into the gear attachment portions 513 and 514 (including gear attachment portion for the gear 53) such that the gears 53 through 55 are rotatably supported on the surface 51A of the supporting member 51 as illustrated in FIG. 4.

As illustrated in FIGS. 4 and 5, the bended portions 515 and 516 of the bended portions 515 through 517 are end portions at the distal end side of the supporting member 51 in the Y direction which are bended toward the surface 51A. The bended portions 515 and 516 cover the gear 55 for protection, and functions as regulating portions to regulate rotation of the gear 55 by contacting the gear 55 when the gear 55 rotates more than necessary.

The bended portion 517 is the end portion at the base end side of the supporting member 51 in the Y direction which is bended toward the surface 51A. The bended portion 517 covers the gear 54 for protection, and has function of positioning the component storage member 451 by contacting the bottom surface of the component storage member 451 when the supporting member 51 is attached to the component storage member 451.

The sensor attachment portion 518 is a portion located at the base of the supporting member 51 in the Y direction. Though not shown in the figure, the sensor attachment portion 518 has a hole into which a screw for fixing the photo-sensor 58 to the surface 51B is inserted and an opening through which light from a sensor unit 581 of the photo-sensor 58 passes toward the surface 51A. This opening is formed at a position corresponding to a notch 542 of the gear 54 to be described later.

The motor 52 generates driving force for rotating the gears 53 through 55 which will be described later. The driving of the motor 52 is controlled by the control unit 93.

The motor 52 includes a motor main body 521 having a spindle (not shown) as a rotation shaft, and the gear 522 provided at the end of the spindle. The motor main body 521 is attached to the surface 51B of the supporting member 51, and the gear 522 is disposed on the surface 51A via the opening 5121 to engage with the gear 53.

As illustrated in FIG. 4, the gear 53 transmits driving force generated by the motor 52 to the gear 54. The gear 53 has a first gear 531 engaging with the gear 522, and a second gear 532 engaging with the gear 54. The first gear 531 and the second gear 532 are disposed coaxially. The diameter of the first gear 531 is larger than that of the second gear 532. The rotation of the gear 522 is decreased by the gear 53 such that the rotation of the motor 52 is reduced to about one tenth at the gears 54 and 55.

The gears 54 and 55 correspond to rotation members of the invention, and are rotatably attached to the supporting member 51 while engaging with each other. Thus, the gears 54 and 55 rotate in the opposite direction by the driving force of the motor 52 transmitted via the gear 53.

The gear 54 is substantially circular in the plan view, but the gear 55 has a size appropriate for the operation range of the light shielding member 57 supported by the gear 55 for miniaturization of the light control device 5. More specifically, the gear 55 has a shape as about one fourth of a circle in the plan view.

The gear 54 has a rotation axis AX1 at the center of the gear attachment portion 513, and the gear 55 has a rotation axis AX2 at the center of the gear attachment portion 514. The gears 54 and 55 rotate around these rotation axes AX1 and AX2. The gears 54 and 55 are disposed such that the rotation axes AX1 and AX2 are positioned orthogonal to the center axis of light released from the first lens array 412. The rotation axes AX1 and AX2 are disposed in the vicinity of the second lens array 413 such that the light shielding members 56 and 57 to be described later can be positioned close to and away from the second lens array 413 according to the rotations of the gears 54 and 55.

The gears 54 and 55 have supporting portions 541 and 551 for supporting the light shielding members 56 and 57 at positions away from the rotation axes AX1 and AX2 and close to the first lens array 412.

The supporting portions 541 and 551 rise from the gears 54 and 55 toward the outside of the surfaces along the rotation axes AX1 and AX2. The light shielding members 56 and 57 provided along the rotation axes AX1 and AX2 are fixed to the supporting members 541 and 551 by screws (not shown).

The notch 542 is formed at one end of the gear 54. Light is applied to the notch 542 from the sensor unit 581 of the photo-sensor 58, and the photo-sensor 58 detects change of light condition at the sensor unit 581 to determine the position of the light shielding member 56 supported by the gear 54. The photo-sensor 58 outputs detection signals indicating the detected condition associated with the position of the light shielding member 56 to the control unit 93.

FIG. 6 is a perspective view showing the positional relationship between the light shielding members 56 and 57 of the light control device 5 and the first lens array 412 and the second lens array 413.

As illustrated in FIG. 6, the light shielding members 56 and 57 are disposed between the first lens array 412 and the second lens array 413 in such positions as to be substantially symmetric with respect to the center axis of light released from the first lens array 412 along the X direction. The light shielding members 56 and 57 are inserted into the transmission area of the light by rotations of the gears 54 and 55 to control the amount of light entering the second lens array 413 by reflecting a part of the light.

As illustrated in FIGS. 4 through 6, the light shielding members 56 and 57 are plate-shaped members each of which has the longitudinal direction along the rotation axes AX1 and AX2 (X direction), and has a substantially mirror-symmetric structure. Each length of the light shielding members 56 and 57 in the longitudinal direction is determined according to the length of the area of the second lens array 413 having the respective small lenses in the same direction, and each length of the light shielding members 56 and 57 in the direction orthogonal to the extending direction (transverse direction) is equivalent to approximately half of the length of the area of the second lens array 413 having the small lenses in the same direction.

The light shielding members 56 and 57 have first light shielding portions 561 and 571 extended in the longitudinal direction, fixing portions 562 and 572, second light shielding portions 563 and 573, and concave portions 564 and 574, which are all formed integrally.

The first light shielding portions 561 and 571 are curved with predetermined curvature around a predetermined axis along the X direction. Thus, the first light shielding portions 561 and 571 are substantially circular-arc-shaped in the side view.

The fixing portions 562 and 572 are flat-plate-shaped on the gears 54 and 55 side of the first light shielding portions 561 and 571 (base side in the X direction). The fixing portions 562 and 572 have holes 5621 and 5721 through which screws (not shown) for fixing the light shielding members 56 and 57 to the supporting portions 541 and 551 are inserted.

Each peripheral portion of the second light shielding portions 563 and 573 facing the other light shielding member of the first light shielding portions 561 and 571 is bended toward the first lens array 412, and each end of the second light shielding portions 563 and 573 in the bending direction is further bended toward the other light shielding member. The second light shielding portions 563 and 573 are substantially rectangular as viewed in the entering direction of light entering the light shielding members 56 and 57 (Z direction), and have the same curvature as that of the first light shielding portions 561 and 571 around a predetermined axis along the X direction. Thus, the second light shielding portions 563 and 573 have substantially circular-arc shapes in the side view. The surfaces of the second light shielding portions 563 and 573 and the first light shielding portions 561 and 571 on the first lens array 412 side constitute light shielding surfaces 56A and 57A for shielding light entering from the first lens array 412.

Thus, the light shielding surfaces 56A and 57A are curved in such positions as not to be orthogonal to the center axis of light released from the first lens array 412 when the light shielding members 56 and 57 are under full-close condition (condition where the light shielding members 56 and 57 are disposed in such positions as to cover the widest area of the second lens array 413) as viewed from the sides of the light shielding members 56 and 57 (X direction).

The concave portions 564 and 574 are concaved toward the inside substantially at the centers of the ends of the second light shielding portions 563 and 573 facing the other light shielding member. The concave portions 564 and 574 are disposed at positions corresponding to the center of light released from the first lens array 412 under the full-close condition discussed above. A part of light having passed through the vicinity of the center of the light as the range having the highest luminance in the light is introduced to the second lens array 413 via the concave portions 564 and 574. By the function of the concave portions 564 and 574, a part of light released from the first lens array 412 can be supplied to the second lens array 413 without completely shielding the light even under the full-close condition of the light shielding members 56 and 57.

Light Shield by Light Shielding Members

The optical path of light reflected by the light shielding members 56 and 57 is now described.

Figure 7:
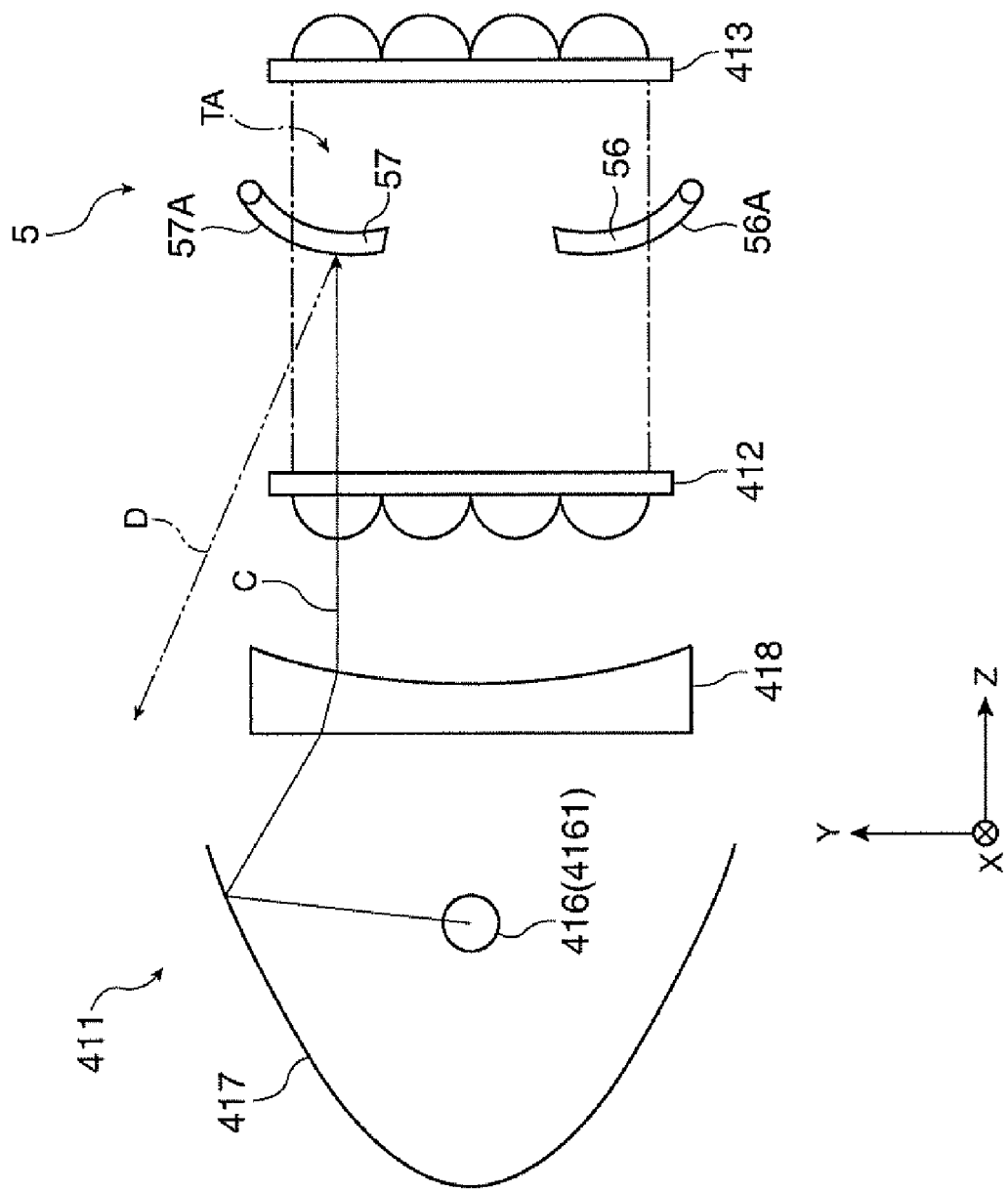
FIG. 7 schematically illustrates an optical path of reflection light reflected by the light shielding members in the first embodiment.
Figure 8:
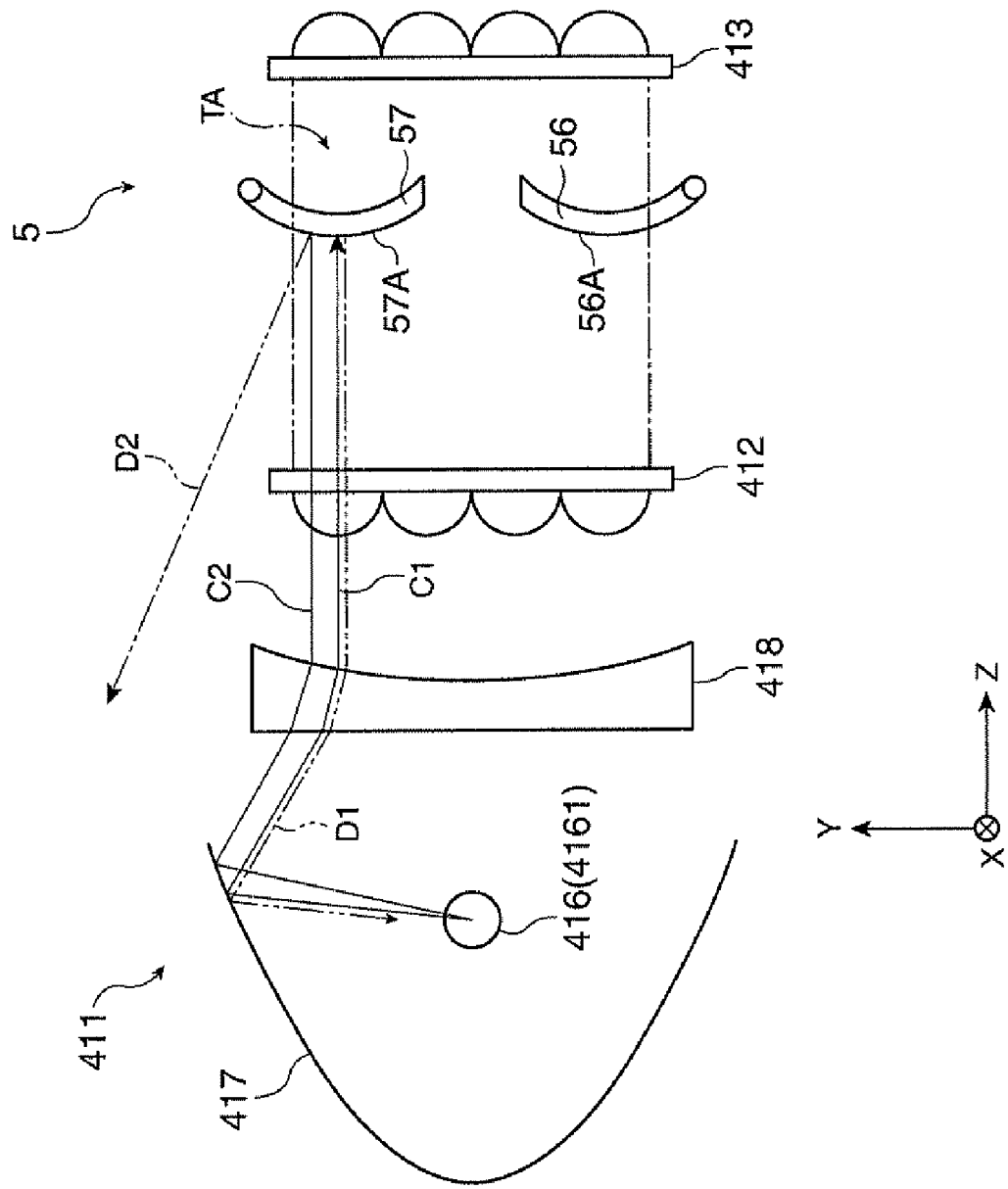
FIG. 8 schematically illustrates an optical path of reflection light reflected by the light shielding members in the first embodiment.

FIGS. 7 and 8 schematically illustrate the optical path of reflection light reflected by the light shielding members 56 and 57. More specifically, FIG. 7 schematically illustrates the optical path of reflection light under the condition where the light shielding members 56 and 57 are slightly inserted into a transmission area TA of light released from the first lens array 412. FIG. 8 schematically illustrates the optical path of reflection light under the condition where the light shielding members 56 and 57 are full-closed.

When the gears 54 and 55 are rotated by the driving force of the motor 52, the light shielding members 56 and 57 supported by the gears 54 and 55 are inserted into the transmission area TA (area indicated by an alternate long and short dash lines in FIGS. 7 and 8) of light released from the first lens array 412 such that a part of the light entrance surface of the second lens array 413 is covered by the light shielding members 56 and 57 as illustrated in FIG. 7.

In this case, light emitted from the light emission unit 4161 of the light source lamp 416 (reflected by the reflector 417 as necessary) and supplied to the light shielding surfaces 56A and 57A via the collimating concave lens 418 and the first lens array 412 (light indicated by an arrow C in FIG. 7, for example) is reflected by the light shielding surfaces 56A and 57A to the outside of the transmission area TA as indicated by an arrow D in FIG. 7. By this arrangement, a part of light released from the first lens array 412 can be shielded in such a manner as not to be supplied to the second lens array 413. Thus, the amount of light supplied to the image forming area of the liquid crystal panel 442 can be reduced.

When the light shielding members 56 and 57 are positioned in the full-close condition, most part of the light entrance surface of the second lens array 413 is covered by the light shielding members 56 and 57 as illustrated in FIG. 8.

In this case, a part of light supplied to the light shielding surfaces 56A and 57A (light supplied to the positions of the light shielding surfaces 56A and 57A orthogonal to the center axis of the transmission area TA such as light indicated by an arrow C1 in FIG. 8) is reflected by the light shielding surfaces 56A and 57A to return to the light emission unit 4161 along the optical path extending from the light emission unit 4161 to the light shielding surfaces 56A and 57A in the opposite direction as indicated by an arrow D1 in FIG. 8. However, most part of light supplied to the light shielding surface 56A and 57A (light supplied to positions of the light shielding surface 56A and 57A not orthogonal to the center axis of the transmission area TA such as light indicated by an arrow C2 in FIG. 8) is reflected to the outside of the transmission area TA by the light shielding surfaces 56A and 57A as indicated by an arrow D2 in FIG. 8, for example, and therefore cannot reach the light emission unit 4161. Thus, temperature increase of the light emission unit 4161 can be prevented by reduction of the amount of light returning to the light emission unit 4161.

According to the projector 1 in this embodiment having this structure, the following advantages can be offered.

(1) The light shielding members 56 and 57 of the light control device 5 disposed between the first lens array 412 and the second lens array 413 have the light shielding surfaces 56A and 57A formed as curved surfaces. In this structure, most part of light supplied to the light shielding surfaces 56A and 57A is reflected to the outside of the transmission area TA of the light under the full-close condition where the light shielding members 56 and 57 are disposed orthogonal to the center axis of light released from the first lens array 412 so as to cover the widest area of the light entrance surface of the second lens array 413 by the light shielding members 56 and 57. Thus, the light does not return to the light emission unit 4161 of the light source lamp 416. Accordingly, the amount of light entering the second lens array 413 can be reduced, and temperature increase of the light emission unit 4161 can be prevented. As a result, deterioration of the light source lamp 416 can be avoided.

(2) By reduction of the amount of light entering the second lens array 413, the amount of light supplied to the liquid crystal panels 442 as the light modulation devices for forming image light can be reduced. Thus, the contrast of projected images can be improved. Furthermore, by preventing deterioration of the light source lamp 416, the light source lamp 416 need not be frequently replaced with new one. Thus, labor for maintenance of the projector 1 can be reduced.

2. Second Embodiment

A projector according to a second embodiment of the invention is now described.

The projector in this embodiment has a structure similar to that of the projector 1 explained above. However, while the projector 1 has the curved light shielding surfaces 56A and 57A of the light shielding members 56 and 57, the projector in this embodiment has flat-plate-shaped light shielding members provided with light absorbing layers on light shielding surfaces. In the following description, similar reference numbers are given to parts similar to those described above, and the same explanation is not repeated.

Figure 9:
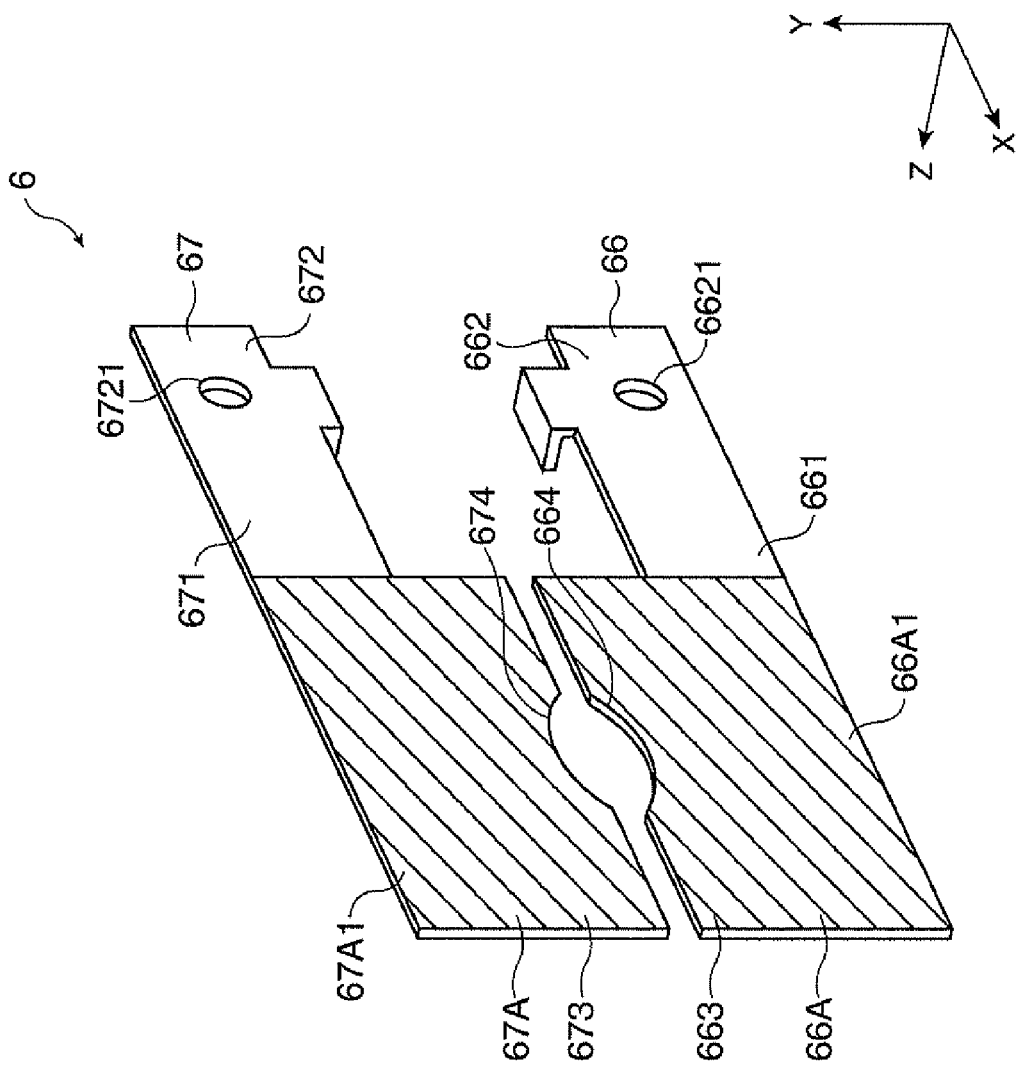
FIG. 9 is a perspective view of light shielding members included in a light control device of a projector according to a second embodiment of the invention.

FIG. 9 is a perspective view of light shielding members 66 and 67 of a light control device 6 included in the projector in this embodiment as viewed from the light entrance side (base side in the Z direction). FIG. 9 does not show components of the light control device 6 other than the light shielding members 66 and 67.

The projector in this embodiment has a structure similar to that of the projector 1 except that the light control device 6 is provided in lieu of the light control device 5. The light control device 6 shields at least a part of light released from the first lens array 412 to control the amount of light entering the second lens array 413 and further the liquid crystal panels 442 similarly to the light control device 5. The light control device 6 has a structure similar to that of the light control device 5 except that the light shielding members 66 and 67 are provided in lieu of the light shielding members 56 and 57.

Similarly to the light shielding members 56 and 57, the light shielding members 66 and 67 are inserted into the transmission area TA of light released from the first lens array 412 according to rotations of the gears 54 and 55 to shield the entering light and thereby control the amount of light entering the second lens array 413. The light shielding members 66 and 67 are disposed symmetric with respect to the center axis of the light in the X direction. As illustrated in FIG. 9, the light shielding members 66 and 67 are flat-plate shaped members having longitudinal direction along the rotation axes AX1 and AX2 of the gears 54 and 55 (X direction; FIG. 4), and are substantially L-shaped as viewed from the light entrance side (base side in the Z direction). The light shielding members 66 and 67 have first light shielding portions 661 and 671 extending in the X direction, fixing portions 662 and 672, second light shielding portions 663 and 673, and concave portions 664 and 674.

The fixing portions 662 and 672 are formed at one ends of the first light shielding members 661 and 671 (base side in the X direction) and attached to the supporting portions 541 and 551 of the gears 54 and 55. The fixing portions 662 and 672 have holes 6621 and 6721 through which screws for fixing the light shielding members 66 and 67 to the supporting portions 541 and 551 are inserted.

Each peripheral portion of the second light shielding portions 663 and 673 facing the other light shielding plate of the first light shielding portions 661 and 671 extends toward the other light shielding plate. Light shielding surfaces 66A and 67A constituted by the second light shielding portions 663 and 673 and the first light shielding portions 661 and 671 (surfaces of the second light shielding portions 663 and 673 and the first light shielding portions 661 and 671 on the light entrance side) are flat surfaces.

The concave portions 664 and 674 are concaved toward the inside substantially at the centers of the ends of the second light shielding portions 663 and 673 facing the other light shielding member similarly to the concave portions 564 and 574. The concave portions 664 and 674 are disposed at positions corresponding to the center of light released from the first lens array 412 under the full-close condition of the light shielding members 66 and 67. A part of light having passed through the vicinity of the center of the light as the range having the highest luminance in the light is introduced to the second lens array 413 via the concave portions 664 and 674.

In this structure, the light shielding surfaces 66A and 67A are coated with light absorbing layers 66A1 and 67A1 by predetermined coating Thus, light supplied to the light shielding surfaces 66A and 67A is absorbed by the light absorbing layers 66A1 and 67A1.

Light Shielding by Light Shielding Members

Light tracks associated with the light shielding members 66 and 67 are now described.

Figure 10:
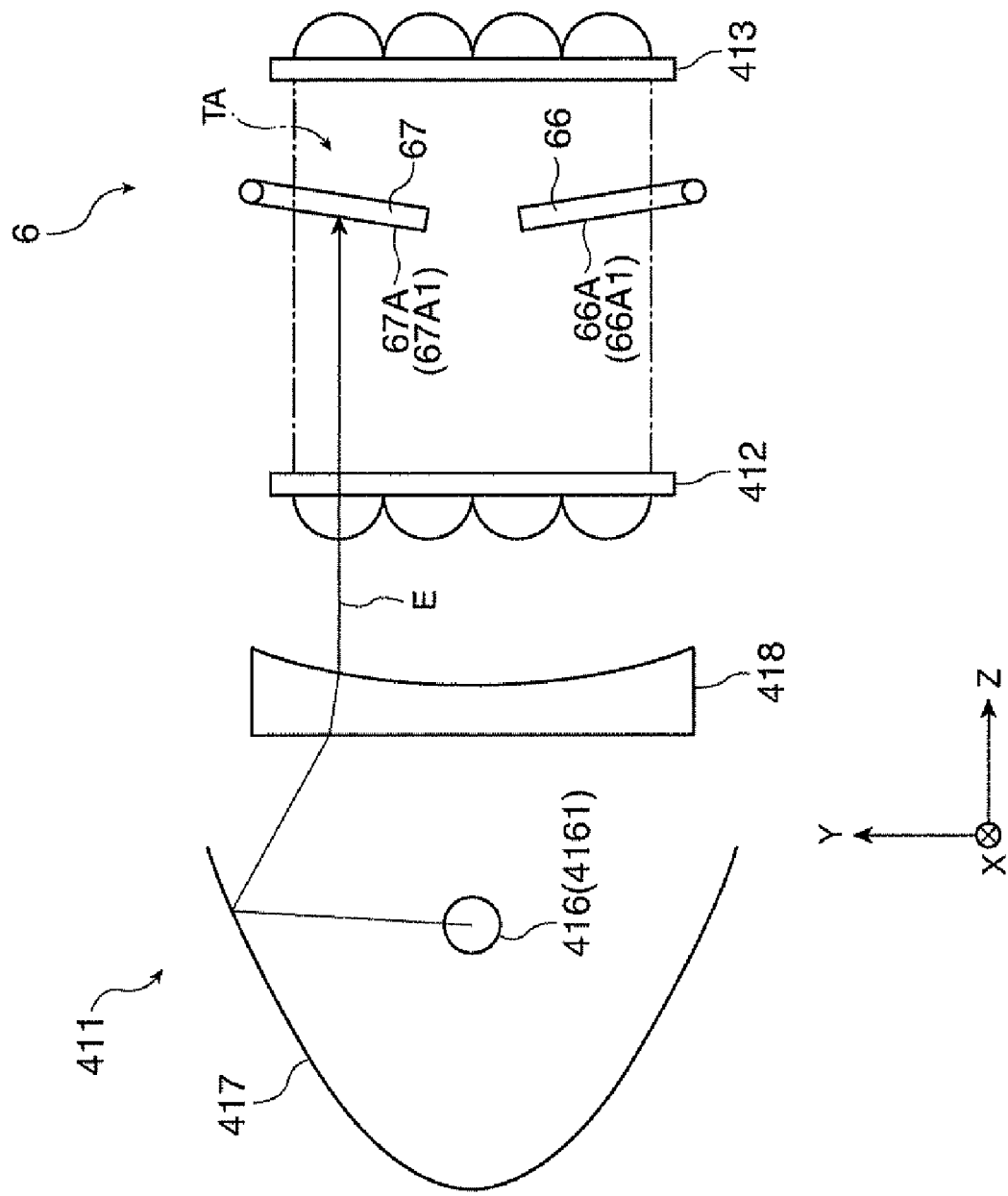
FIG. 10 schematically illustrates an optical path of light supplied to the light shielding members in the second embodiment.
Figure 11:
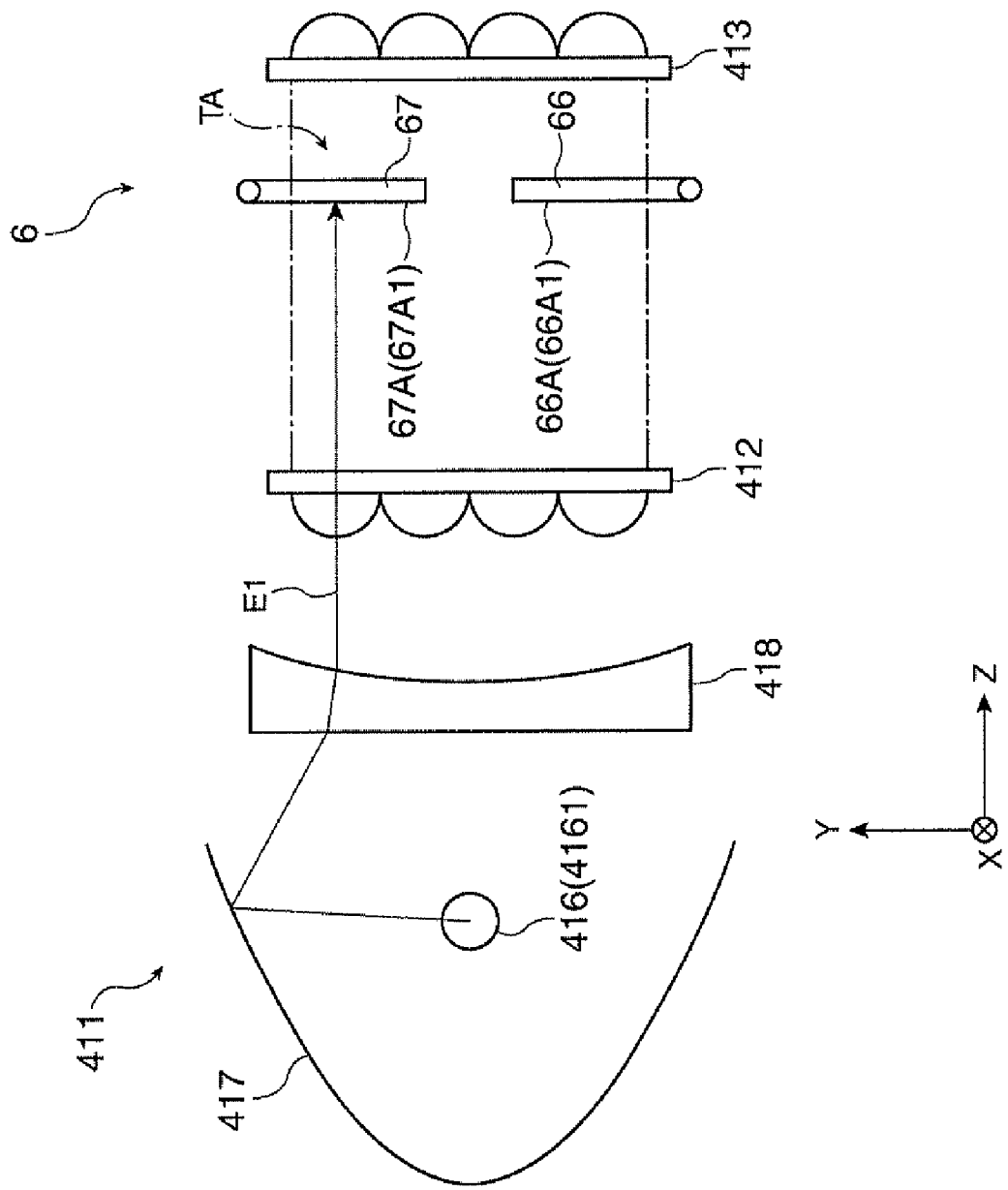
FIG. 11 schematically illustrates an optical path of light supplied to the light shielding members in the second embodiment.

FIGS. 10 and 11 schematically illustrate optical paths of light supplied to the light shielding members 66 and 67. More specifically, FIG. 10 schematically illustrates the optical path of light under the condition where the light shielding members 66 and 67 are slightly inserted into the transmission area TA of light released from the first lens array 412. FIG. 11 schematically illustrates the optical path of light under the condition where the light shielding members 66 and 67 are full-closed.

When the light shielding members 66 and 67 are inserted into the transmission area TA such that the light shielding surfaces 66A and 67A are inclined to the center axis of the transmission area TA, light emitted from the light emission unit 4161 of the light source lamp 416 and supplied to the light shielding surfaces 66A and 67A via the first lens array 412 (such as light indicated by an arrow E in FIG. 10) is absorbed by the light absorbing layers 66A1 and 67A1 as shown in FIG. 10. By this method, the amount of light entering the second lens array 413 can be reduced. When the light shielding surfaces 66A and 67A are inclined to the center axis of the transmission area TA as illustrated in FIG. 10, there is a possibility that light not absorbed by the light absorbing layers 66A1 and 67A1 is reflected by the light shielding surfaces 66A and 67A and reaches the light emission unit 4161 of the light source lamp 416. However, light reflected by the light shielding surfaces 66A and 67A which are inclined travels to the outside of the transmission area TA. Thus, the amount of light having reached the light emission unit 4161 of the light source lamp 416 can be reduced.

When the light shielding members 66 and 67 are inserted into the transmission area TA such that the light shielding surfaces 66A and 67A are positioned orthogonal to the center axis of the transmission area TA (such that the light shielding members 66 and 67 are in the full-close condition), light supplied to the light shielding surfaces 66A and 67A (such as light indicated by an arrow E1 in FIG. 11) is absorbed by the light absorbing layers 66A1 and 67A1 as illustrated in FIG. 11. When the light shielding surfaces 66A and 67A are disposed orthogonal to the center axis of the transmission area TA as illustrated in FIG. 11, there is a possibility that light not absorbed by the light absorbing layer 66A1 and 67A1 is reflected by the light shielding surfaces 66A and 67A and reaches the light emission unit 4161 of the light source lamp 416. However, the amount of light reflected by the light shielding surfaces 66A and 67A is smaller than the amount of light supplied to the light shielding surfaces 66A and 67A by the function of the light absorbing layers 66A1 and 67A1. Thus, the amount of light entering the second lens array 413 can be decreased with reduction of the amount of light returning to the light emission unit 4161. Accordingly, the amount of light supplied to the image forming area of the liquid crystal panels 442 can be reduced.

According to the projector in this embodiment having this structure, the following advantages can be provided as well as the advantage (2) of the projector 1.

(3) The light absorbing layers 66A1 and 67A1 for absorbing received light are provided on the light shielding surfaces 66A and 67A as the light entrance surfaces of the light shielding members 66 and 67 inserted into the transmission area TA of light released from the first lens array 412. Since light supplied to the light shielding surfaces 66A and 67A is absorbed by the light absorbing layers 66A1 and 67A1 in this structure, the amount of light reaching the light emission unit 4161 of the light source lamp 416 can be reduced. Thus, temperature increase of the light source lamp 416 can be prevented, and deterioration of the light source lamp 416 can be decreased.

Even when light not absorbed by the light absorbing layers 66A1 and 67A1 is reflected by the light shielding surfaces 66A and 67A, the reflected light can be further reflected to the outside of the transmission area TA due to inclination of the light shielding surfaces 66A and 67A. Also, the amount of light reflected by the light shielding surfaces 66A and 67A is smaller than the amount of light supplied to the light shielding surfaces 66A and 67A. Thus, the amount of light reaching the light emission unit 4161 can be reduced.

3. Third Embodiment

A projector according to a third embodiment of the invention is now described.

The projector in this embodiment has a structure similar to that of the projector 1 described above. However, while the light shielding surfaces 56A and 57A of the light control device 5 included in the projector 1 are circular-arc-shaped around the predetermined axis along the X direction, light shielding surfaces of light shielding members included in a light control device of the projector in this embodiment are substantially ellipsoidal around a predetermined axis along the X direction and a predetermined axis along the Y direction.

Figure 12:
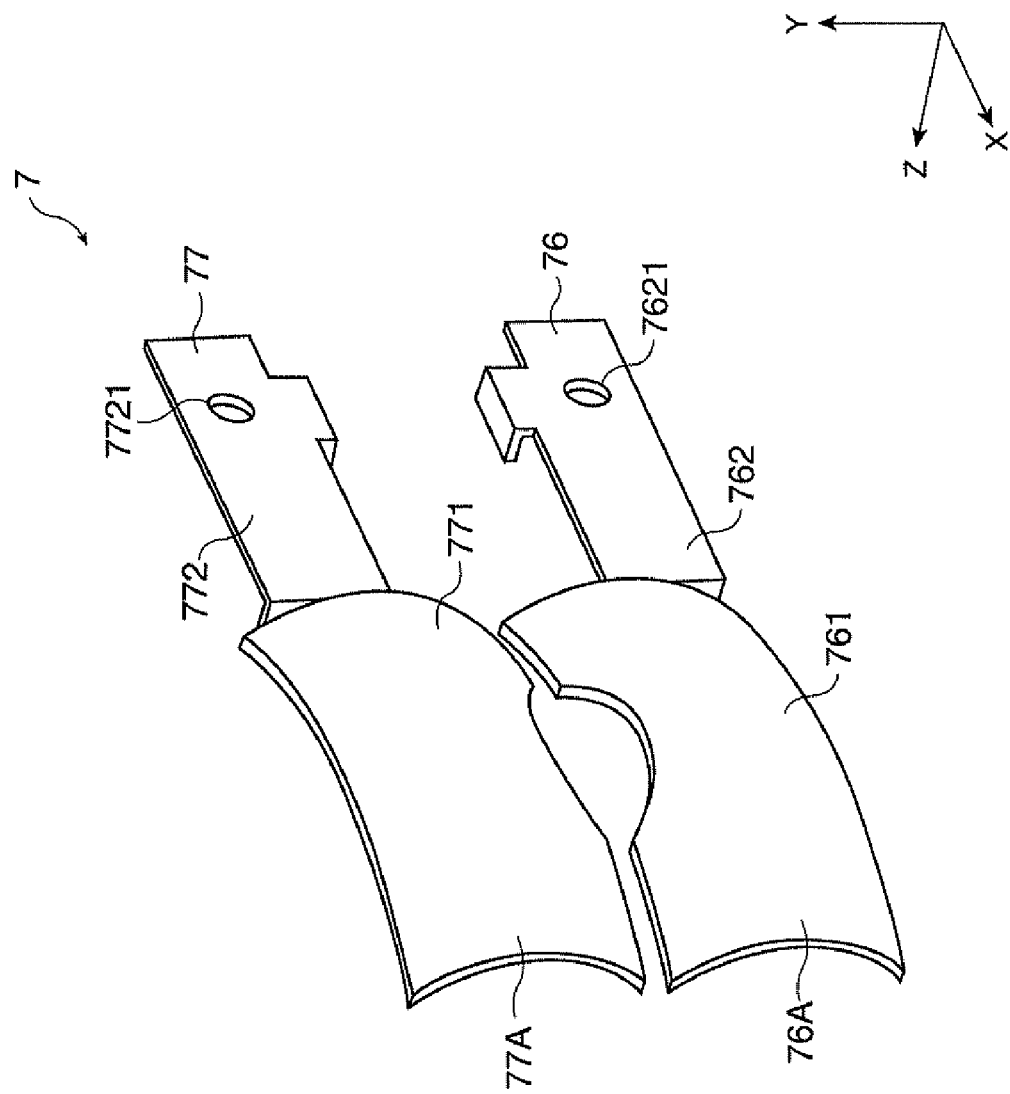
FIG. 12 is a perspective view of light shielding members included in a light control device of a projector according to a third embodiment of the invention.

FIG. 12 is a perspective view of light shielding members 76 and 77 included in a light control device 7 of the projector in this embodiment as viewed from the light entrance side (base side in the Z direction). FIG. 12 does not show components of the tight control device 7 other than the light shielding members 76 and 77.

The projector in this embodiment has a structure similar to that of the projector 1 except that the light control device 7 is provided in lieu of the light control device 5. The light control device 7 shields at least a part of light released from the first lens array 412 to control the amount of light entering the second lens array 413 and further the liquid crystal panels 442 similarly to the light control device 5. The light control device 7 has a structure similar to that of the light control device 5 except that the light shielding members 76 and 77 are provided in lieu of the light shielding members 56 and 57.

Similarly to the light shielding members 56 and 57, the light shielding members 76 and 77 are inserted into the transmission area TA of light released from the first lens array 412 according to rotations of the gears 54 and 55 to shield the entering light and thereby control the amount of light entering the second lens array 413. As illustrated in FIG. 12, the light shielding members 76 and 77 are flat-plate-shaped members having longitudinal direction along the X direction, and are formed as one-body components having light shielding portions 761 and 771 inserted into the transmission area TA, and fixing portions 762 and 772.

The fixing portions 762 and 772 are flat-plate-shaped and disposed at positions of the light shielding portions 761 and 771 facing the gears 54 and 55 (base side in the X direction). The fixing portions 762 and 772 have holes 7621 and 7721 through which screws for fixing the light shielding members 76 and 77 to the holding portions 541 and 551 of the gears 54 and 55 are inserted.

The light shielding portions 761 and 771 are circular-arc-shaped around an axis extending along the X direction and around an axis extending along the Y direction when the light shielding members 76 and 77 are in the full-close condition. Thus, while the light shielding portions 761 and 771 are substantially rectangular as viewed in the light entrance direction (Z direction), each of the light shielding portions 761 and 771 which is circular-arc-shaped as viewed in the X direction and the Y direction becomes substantially ellipsoidal on the whole. Thus, each of the light shielding surfaces 76A and 77A as the light entrance surfaces of the light shielding portions 761 and 771 has substantially ellipsoidal shape.

In this structure, light supplied to the light shielding surfaces 76A and 77A is reflected in such a manner as to be diffused to the outside of the transmission area TA under the full-close condition of the light shielding members 76 and 77. Thus, the amount of light returning to the light emission unit 4161 can be reduced.

According to the projector in this embodiment having this structure, advantages (1) and (2) of the projector 1 can be offered.

4. Fourth Embodiment

A projector according to a fourth embodiment of the invention is now described.

The projector in this embodiment has a structure similar to that of the projector 1 described above. However, while the light shielding surfaces 56A and 57A of the light shielding members 56 and 57 of the light control device 5 included in the projector 1 are curved to decrease light returning to the light emission unit 4161 of the light source lamp 416 under the full-close condition of the light shielding members 56 and 57, light shielding surfaces of light shielding plates included in the projector in this embodiment have convex portions having surfaces inclined to the center axis of the transmission area TA when the light shielding plates are in the full-close condition.

Figure 13:
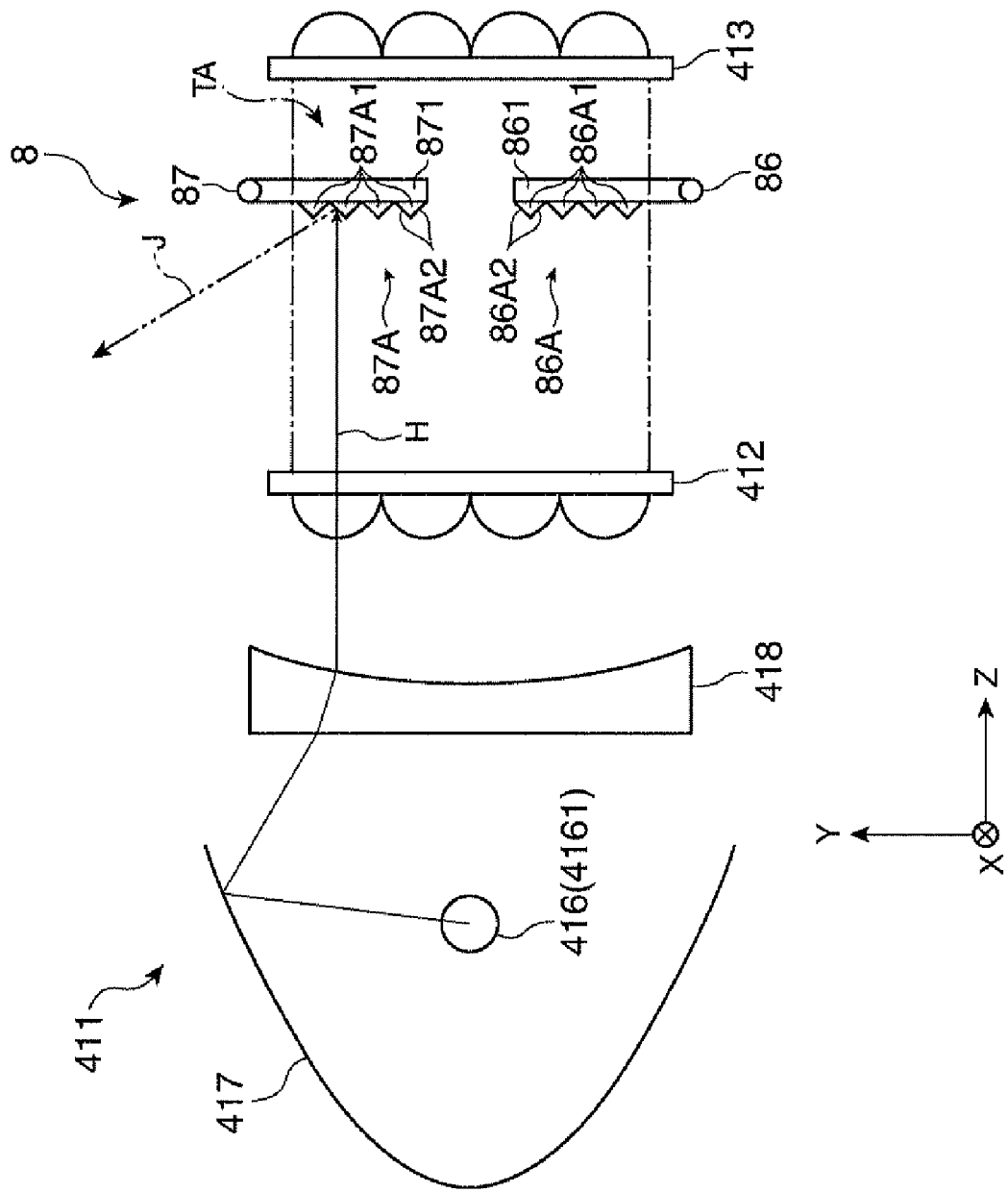
FIG. 13 schematically illustrates a structure of light shielding members included in a light control device of a projector according to a fourth embodiment of the invention, and an optical path of reflection light reflected by the light shielding members.

FIG. 13 schematically illustrates structures of light shielding members 86 and 87 of a light control device 8 included in the projector in this embodiment, and optical paths of reflection lights reflected by light shielding surfaces 86A and 87A under the full-close condition of the light shielding members 86 and 87. FIG. 13 does not show components of the light control device 8 other than the light shielding members 86 and 87.

The projector in this embodiment has a structure similar to that of the projector 1 except that the light control device 8 is provided in lieu of the light control device 5. The light control device 8 has a structure similar to that of the light control device 5 except that the light shielding members 86 and 87 are provided in lieu of the light shielding members 56 and 57.

The light shielding members 86 and 87 have light shielding portions 861 and 871 extending along the rotation axes AX1 and AX2 of the gears 54 and 55 when attached to the gears 54 and 55 and having longitudinal direction along the rotation axes AX1 and AX2 (X direction), and the fixing portions 662 and 672 formed on the base areas of the light shielding portions 861 and 871 in the X direction and fixed to the supporting portions 541 and 551. The light shielding members 86 and 87 are disposed symmetric with respect to the center axis of light released from the first lens array 412.

As illustrated in FIG. 13, a plurality of protrusions 86A1 and 87A1 having substantially triangular shape in the cross-sectional view and containing inclined surfaces 86A2 and 87A2 inclined to the center axis of the transmission area TA of light released from the first lens array 412, under the full-close condition of the light shielding members 86 and 87 are provided on the light shielding surfaces 86A and 87A as light entrance surfaces of the light shielding portions 861 and 871 with no clearance between one another in the X direction. Each angle of the inclined surfaces 86A2 and 87A2 to the center axis of the transmission area TA is set at 45 degrees or larger. At this angle, light supplied to and reflected by the inclined surfaces 86A2 and 87A2 does not easily reach the light emission unit 4161 of the light source lamp 416 via the first lens array 412.

Under the full-close condition of the light shielding members 86 and 87, light supplied to the light shielding surfaces 86A and 87A from the light emission unit 4161 via the first lens array 412 (such as light indicated by an arrow H in FIG. 13) is reflected to the outside of the transmission area TA by the inclined surfaces 86A2 and 87A2 of the protrusions 86A1 and 87A1 as indicated by an arrow J in FIG. 13, for example. Thus, the reflection light reflected by the light shielding surfaces 86A and 87A does not travel along the optical path extending from the light emission unit 4161 of the light source lamp 416 to the light shielding surfaces 86A and 87A in the opposite direction to reach the light emission unit 4161. Moreover, the amount of light entering the second lens array 413 can be reduced.

According to the projector in this embodiment, the following advantage can be offered as well as the advantage (2) of the projector 1.

(4) In the full-close condition of the light shielding members 86 and 87, light supplied to the light shielding surfaces 86A and 87A of the light shielding members 86 and 87 is reflected to the outside of the transmission area TA of light released from the first lens array 412 by the inclined surfaces 86A2 and 87A2 of the protrusions 86A1 and 87A1 formed on the light shielding surfaces 86A and 87A. In this structure, the amount of light supplied to the light shielding surfaces 86A and 87A and reflected to the light emission unit 4161 of the light source lamp 416 is smaller than that of light supplied to light shielding members not having the protrusions 86A1 and 87A1. Thus, temperature increase of the light source lamp 416 can be prevented, and deterioration of the light source lamp 416 can be reduced.

5. Modified Example

The invention is not limited to the embodiments described and depicted herein, and it is therefore intended that modifications and improvements can be made without departing from the scope and spirit of the invention.

According to the first and third embodiments, the light shielding surfaces 56A, 57A, 76A, and 77A are curved and projected toward the first lens array 412 so as to reduce the amount of light emitted from the light emission unit 4161 of the light source lamp 416 and reflected and supplied to the light emission unit 4161. According to the second embodiment, the light absorbing layers 66A1 and 67A1 are provided on the light shielding surfaces 66A and 67A. According to the fourth embodiment, the protrusions 86A1 and 87A1 are provided on the light shielding surface 86A and 87A. However, such light shielding members may be employed which have protrusions similar to the protrusions 86A1 and 87A1 provided on light shielding surfaces curved similarly to the light shielding surfaces 56A, 57A, 76A, and 77A, and also light absorbing layers on the light shielding surfaces.

According to the fourth embodiment, the light shielding surfaces 86A and 87A have the protrusions 86A1 and 87A1 which include the inclined surfaces 86A2 and 87A2 having inclination angle of 45 degrees or larger with respect to the center axis of the transmission area TA of light released from the first lens array 412 under the full-close condition of the light shielding members 86 and 87. However, the inclination angle of the inclined surfaces on the protrusions may be appropriately varied as long as supplied light is not easily reflected to the light emission unit 4161 under the full-close condition of the light shielding members 86 and 87.

According to the embodiments, the light shielding members 56, 57, 66, 67, 76, 77, 86, and 87 are disposed substantially symmetric with respect to the center axis of light released from the first lens array 412. However, one light shielding member may shield the light to reduce the amount of light entering the second lens array 413.

According to the embodiments, the light shielding members 56, 57, 66, 67, 76, 77, 86, and 87 are disposed between the first lens array 412 and the second lens array 413. However, the positions of the light shielding members may be appropriately changed. For example, the light shielding members may be disposed on the optical paths of respective color lights divided by the color separation optical device 42 when the amount of supplied light is desired to be controlled for each of the liquid crystal panels 442.

According to the embodiments, the projector includes the three liquid crystal panels 442R, 442G, and 442B. However, the invention is applicable to projectors having two or smaller number of liquid crystal panels or having four or larger number of liquid crystal panels.

According to the embodiments, the optical unit 4 is substantially L-shaped in the plan view. However, the optical unit 4 may be substantially U-shaped in the plan view, for example.

According to the embodiments, the transmission-type liquid crystal panels 442 having both light entrance surface and light exit surface are used. However, reflection-type liquid crystal panels having the same surface for receiving and emitting light may be employed.

According to the embodiments, the projector including the liquid crystal panels 442 as light modulation devices is discussed. However, light modulation devices having other structure may be used as long as they are optical modulation devices for modulating received light according to image information to form optical images. For example, the invention is applicable to a projector including a light modulation device which uses devices such as micro-mirrors other than liquid crystals. When such an optical modulation device is employed, the polarization plates 443 and 445 on the light entrance side and light exit side can be removed.

According to the embodiments, the lighting optical device having the light control device is included in the projector. However, the lighting optical device 41 may be used as a separate component.

The technology of the invention is appropriately used for a light control device and a lighting device included in a projector.

The entire disclosure of Japanese Patent Application No. 2008-059660, filed Mar. 10, 2008 and No. 2008-318112 filed Dec. 15, 2008 are expressly incorporated by reference herein.

What is claimed is:

1. A light control device which controls the transmission amount of light emitted from a predetermined emission area, comprising:
   a rotation member having a rotation axis extending in a direction substantially orthogonal to a center axis of the light; and
   a light shielding member supported by the rotation member and configured to shield at least a part of the light by rotation of the rotation member, the light shielding member having a light shielding surface which shields received light, the light shielding member being curved with a predetermined curvature around the rotation axis, the light shielding surface being curved in such a manner as to project toward the emission area, the light shielding surface being formed on a convex surface of the light shielding member facing the predetermined emission area such that the light emitted from the emission area is incident to the convex surface of the light shielding surface being formed on the convex surface,
   the light shielding surface being so processed as to reduce the amount of light reflected by the light shielding surface and reaching the emission area, and
   the light shielding surface being configured such that a part of the light emitted from the emission area is reflected outside the emission area.

2. The light control device according to claim 1, wherein a light absorbing layer which absorbs light supplied to the light shielding surface is provided on the light shielding surface.

3. The light control device according to claim 1, wherein the light shielding surface has a protrusion containing an inclined surface inclined to the center axis of the light when the light shielding member is disposed substantially orthogonal to the center axis of the light.

4. A lighting device comprising:
   a light source device emitting light, the light source device has a light source lamp having a light emission unit for emitting light, and a reflection mirror for reflecting light emitted from the light source lamp and releasing the light in one direction; and
   the light control device according to claim 1,
   the light shielding member is disposed on the optical path of the light, and
   the emission area is the light emission unit of the light source lamp.

5. A projector comprising:
   the lighting device according to claim 4;
   a light modulation device which modulates light emitted from the lighting device to form image light corresponding to image information; and
   a projection optical device which projects the image light formed by the light modulation device.

6. The light control device according to claim 1, wherein the light shielding surface is curved in such a manner as to project toward the emission area when the light shielding member is disposed substantially orthogonal to the center axis of the light.

* * * * *